(No Model.) 2 Sheets—Sheet 1.
J. DES GEORGES.
BRAKE FOR VEHICLES.
No. 529,785. Patented Nov. 27, 1894.
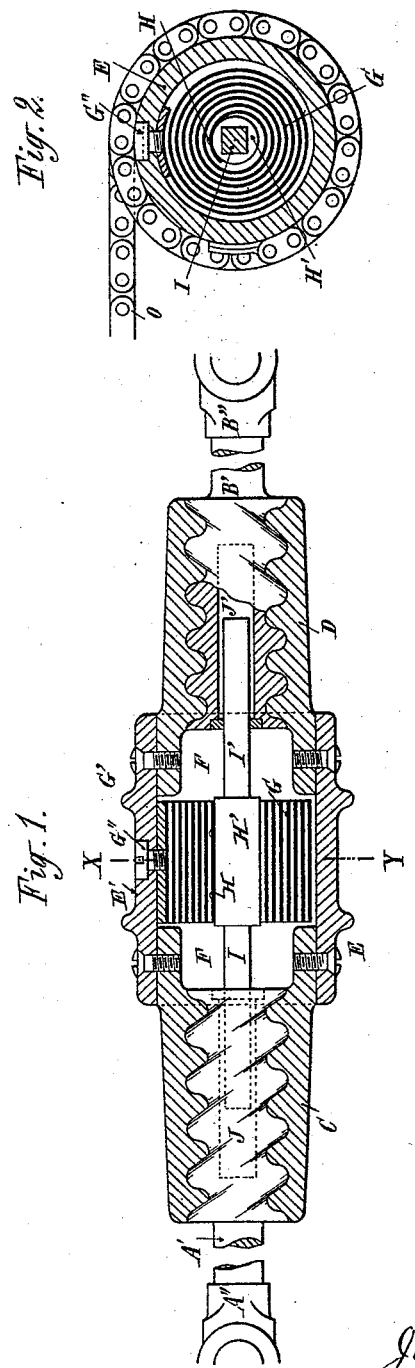
Witnesses
Thomas Durant
Wallace Murdock
Inventor:
Jules des Georges (No Model.) 2 Sheets—Sheet 2.

J. DES GEORGES.
BRAKE FOR VEHICLES.

No. 529,785. Patented Nov. 27, 1894.

Witnesses
Thomas Durant
Wallace Murdock

Inventor
Jules des Georges

UNITED STATES PATENT OFFICE.

JULES DES GEORGES, OF PARIS, FRANCE.

BRAKE FOR VEHICLES.

SPECIFICATION forming part of Letters Patent No. 529,785, dated November 27, 1894.

Application filed July 21, 1894. Serial No. 518,290. (No model.) Patented in France November 23, 1892, No. 225,877; in England March 4, 1893, No. 4,763; in Spain February 27, 1894, No. 15,317, and in Italy March 2, 1894, XXVIII, 35,495, LXX, 112.

*To all whom it may concern:*

Be it known that I, JULES DES GEORGES, a citizen of the Republic of France, residing at Paris, France, have invented certain new and useful Improvements in or Relating to Brakes for Vehicles, (for which I have obtained patents in France, No. 225,877, dated November 23, 1892; in England, No. 4,763, dated March 4, 1893; in Spain, No. 15,317, dated February 27, 1894, and in Italy, Vol. XXVIII, No. 35,495, and Vol. LXX, No. 112, dated March 2, 1894,) of which the following is a specification.

The construction and employment of this improved brake-mechanism will be best understood by reference to the accompanying drawings, in which—

Figure 3:
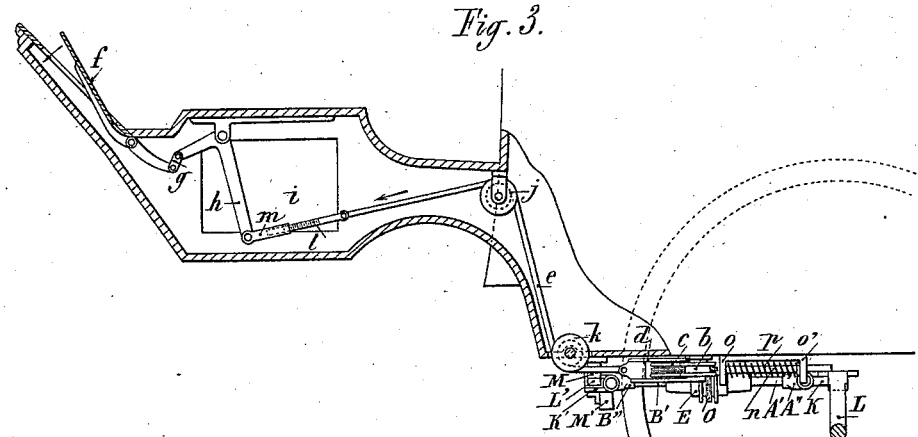
Figure 5:
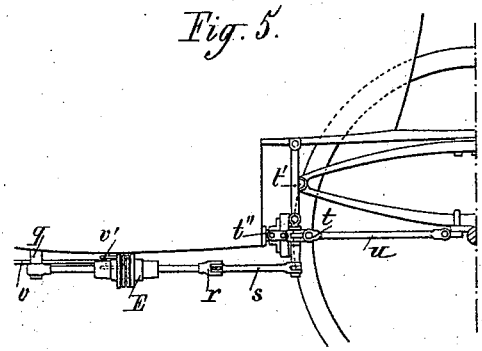
Figure 6:
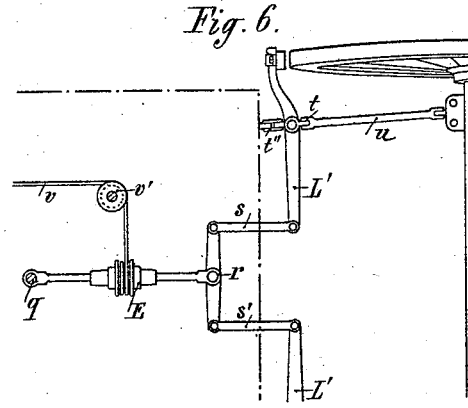
Figure 4:
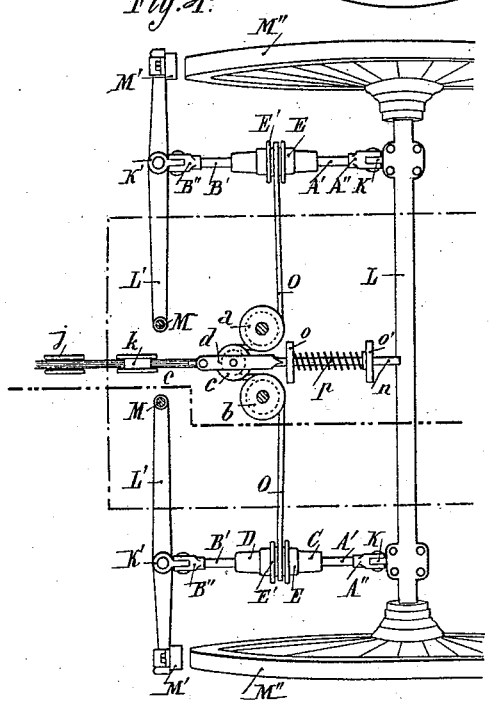

Figure 1 is a view partly in elevation and partly in longitudinal section. Fig. 2 is a transverse section on line X Y Fig. 1. Fig. 3 is a sectional elevation of part of a heavy vehicle such for example as an omnibus, fitted with the improved brake-device. Fig. 4 is a plan corresponding to Fig. 3. Fig. 5 is an elevation of part of a light vehicle such for example as a cab provided with the improved brake-device, and Fig. 6 is a plan corresponding to Fig. 5.

Referring in the first place to Figs. 1 and 2, it will be seen that the improved brake-mechanism, the principal object of which is to cause the brake-shoe instantaneously to approach and firmly engage the wheels of the vehicle, as a result of a very slight effort on the part of the driver, mainly consists of two screws threaded in opposite directions to each other, that is to say while A has a right-hand thread B has a left hand thread. The outer ends of these screws have rod extensions A' and B' respectively. These rods A' and B' terminate in yokes A'' and B'' (Figs. 3 and 4) serving to connect the mechanism with other operating and retaining parts. The screws A and B are each fitted within a nut C and D respectively, and these nuts C and D are connected at their adjacent ends by a sleeve E, a space F being left between these ends. Part of this space is occupied by a spring G, the object and operation of which is set forth further on. The spring G is secured at its external end G' to the inside of the sleeve E preferably by means of a screw G'' introduced from the outside, while its inner end H is connected with a shaft H' extending on each side in the shape of square rods I I', which enter corresponding recesses J J' also of square shape provided with the screws A B and coinciding with the axes of the same. It will be seen that owing to this arrangement the rods A' B' and consequently the screws A B are prevented from turning, and that if the sleeve E is turned in one direction the nuts C D connected therewith will turn with it, which will cause the screws to be moved closer to each other. If therefore the yoke A'' of the rod A' be connected to a fixed point, i. e., if the screw A is incapable of moving in the longitudinal direction, the rotation of the sleeve E will on the one hand cause the nuts C D and the sleeve E to move forward on the screw A and on the other hand the screw B will move within its nut D provided of course that said screw B is free to move longitudinally. The speed with which the screws A and B will move toward or from each other will therefore be twice as great as it would be if only one screw were to operate in a nut.

The foregoing is a description of the principle of the improved brake-device and it will be seen by reference to Figs. 3, 4, 5 and 6 what is considered the best method of applying it to actual practice and of operating it in connection with carriages and vehicles of various kinds.

In Figs. 3 and 4 the device is shown as applied to a heavy vehicle such as an omnibus for which purpose it has preferably two sleeves E one for each brake-shoe. In this arrangement the yoke A'' of the rod A' of screw A is connected to a suitable point K of the appropriate wheel axle L. The yoke B'' of the rod B' of screw B is connected to a suitable point K' of a lever L' which is pivoted at one end to a fixed point M under or on the body of the carriage and carries the brake-shoe M' at its other end in the vicinity of the vehicle wheel M''. The arrangement in connection with the wheel on the left of the vehicle is of course similar to that of the wheel on the right. The sleeve is thus situated between the axle L and the lever L' carrying the brake-shoe M'.

The outer periphery of the sleeve E is provided with a groove E' within which one end of a chain O is secured by means of a screw or equivalent, the other end of the chain O being similarly secured to the sleeve E operating the brake of the other wheel. The central portion of the chain O passes over two pulleys $a$ $b$ turning on shafts secured to the bottom of the vehicle and arranged symmetrically on each side of the longitudinal axis thereof, and also over a third pulley $c$ adapted to exercise a drawing or pulling action, and mounted in a yoke or frame $d$ the head of which is connected with the draw-chain $e$ operated from the driver's seat by means of a pedal $f$ or hand-lever or if desired through another lever $g$ $h$ and link $i$. Pulleys $j$ $k$ suitably arranged within the body of the vehicle, insure the proper operation of the draw-chain $e$ the tension of which is adjustable by means of the rod $l$ screwed into the sleeve $m$, said rod $l$ and sleeve $m$ together constituting the last-mentioned link $i$.

The frame or yoke $d$ is extended backward from the chain $e$ the extension assuming the shape of a rod $n$ guided within brackets $o$ $o'$ secured to the bottom of the vehicle, said rod being acted upon by a spring $p$ tending to bring the said yoke or frame $d$ and also therefore through the various connections, the pedal $f$ back to the position of rest. It will therefore be understood that when the pedal is depressed in the direction of the arrow, the lever $g$ $h$ and link $i$, chain $e$, rod $n$, yoke $d$, pulley $c$, and the parts connected with the chain O will also move in the direction of the respective arrows, and the ends of the chain O will be unwound in their grooves E' from the sleeves E, whereby these sleeves and the nuts C D will receive rotary motion, with the result that as before stated, the rapid movement of the screws B toward A will cause the brake-shoes M' to move against the wheels M" and very firmly to bear upon them During the rotation of the sleeves E the internal springs G are so wound up and stretched that when the pressure upon the pedal $f$ is discontinued and said springs G expand as they unwind and drive both the sleeves E and the nuts C and D in the opposite direction, thereby causing the screws A B to move away from each other, with the evident result that the brake-shoes M' will also move away from the wheels M" and thus release them. As soon as the pedal $f$ is no longer depressed, the spring $p$ acts upon the rod $n$ of the yoke $d$ so as to move back said yoke $d$ along with the pulley $c$ which it carries and thereby to bring the draw-chain $e$, lever $g$ $h$, link $i$ and the pedal $f$ itself back to their initial positions. The springs G of the sleeves E then only have to operate with a view to withdrawing the brake-shoes M' from the wheels and drawing the transverse chain O back to its original position. Owing to the arrangement of this draw-chain, any want of simultaneousness in the action of the respective brakes, which may be owing to the rim of the wheel not being strictly circular, will in no way interfere with the proper operation of the device, for it will be understood that if one of the shoes should act upon its wheel before the other, as the chain O will still continue its drawing action, under the action of the pedal $f$, the pulley on the part of the chain corresponding with the brake-shoe which is somewhat late in operating will continue till this brake-shoe does operate.

Figs. 5 and 6 illustrate the employment of this improved brake-device in connection with light vehicles such as cabs or the like. In this case one sleeve E will be sufficient. This sleeve is arranged so as to coincide with the longitudinal axis of the vehicle, under the bottom surface thereof, and its fixed point is at $q$, while the end of the opposite longitudinally moved screw is linked to the central portion of a lever $r$ which links S S' connect respectively, to the two levers L' carrying the brake-shoes M'. These brake-shoe-carrying-levers are pivoted on fixed pivots $t$ connected to the body of the vehicle preferably by two links or rods, one $t''$, horizontal and the other, $t'$, vertical, and also to the axle of the wheel by a rod $u$. The draw-chain $v$ operating the sleeve E is conducted over a pulley $v'$ under the body of the vehicle so as to be connected to the pedal intended to operate the brake.

The two methods of carrying out this invention have only here been described and shown by way of example and in order to enable the principle and practical value of the invention to be more readily understood. It will be obvious from the foregoing description that the main feature of the improved brake-device is the double-screw sleeve, in which the two screws are threaded in opposite directions one of the said screws being stationary, while the other is capable of longitudinal displacement, as is also the sleeve receiving the screws. The sleeve therefore turns on the stationary screw, while the movable screw moves longitudinally within the sleeve, whereby the ends of the screws are adapted to be moved closer together or farther apart, by which arrangment the speed of motion of the movable screw and also consequently of the devices connected therewith, is doubled.

The before described apparatus may be modified without departure from the principle of the invention. For example the spring within the sleeve may if preferred, be dispensed with and replaced by a spiral spring of either flat or other shape arranged externally and tending to draw back the sleeve which in that case would be formed in one piece.

I claim—

1. Mechanism for brakes of vehicles comprising a sleeve threaded at each end for screwed rods with equal and opposite threads, one rod being fixed and the other movable in the longitudinal direction, and working within the sleeve which moves it while it is itself similarly movable and moved longitudinally by turning upon the fixed screw, the combination having for its effect to double the rapidity of action of the fixed screw and consequently also of the parts operated by it.

2. In a brake apparatus the combination with the oppositely screw threaded rods, one fixed and the other longitudinally movable, of nuts engaging said rods, the sleeve secured to said nuts, a non-cylindrical bar engaging said rods and a spring connected with the bar and sleeve; substantially as described.

3. In brake apparatus the combination of fixed and non-revoluble and longitudinally movable right and left handed screwed rods, right and left handed nut or sleeve, non-cylindrical bar engaging with the rods, spring connected with the bar and sleeve, pulley on the nut, chain or cord secured to the pulley, spring controlled lever mechanism for pulling and releasing the chain and brake shoe, and brake-shoe lever.

In testimony whereof I have hereunto set my hand in the presence of the two subscribing witnesses.

JULES DES GEORGES.

Witnesses:
ACHILLE MARILLIER,
JEAN ROBELET.